United States Patent [19]

Pappas et al.

[11] 4,170,189

[45] Oct. 9, 1979

[54] SENSOR ELEMENT AND ASSEMBLY FOR THERMALLY RESPONSIVE APPARATUS

[75] Inventors: Michael Pappas, Irvington; Paul A. Witte, Hopewell; Christopher N. Severud, Jr., Summit, all of N.J.

[73] Assignee: Falcon Safety Products, Inc., Mountainside, N.J.

[21] Appl. No.: 796,157

[22] Filed: May 12, 1977

Related U.S. Application Data

[63] Continuation-in-part of Ser. No. 754,752, Dec. 27, 1976, abandoned.

[51] Int. Cl.² ..................... G08B 17/00; B67D 5/10
[52] U.S. Cl. ..................... 116/106; 169/42; 222/39
[58] Field of Search ..................... 116/101–103, 116/106, 112, 114.5; 169/5, 26, 42; 222/23, 39, 58, 59, 180, 189, 66, 263, 506, 660, 884, 368; 73/358; 228/57; 428/648, 645, 617

[56] References Cited

U.S. PATENT DOCUMENTS

| 911,162 | 2/1909 | Rockwood | 116/106 |
|---|---|---|---|
| 1,112,226 | 9/1914 | Miller | 116/106 |
| 1,229,299 | 6/1917 | Lindemann | 116/106 |
| 1,435,323 | 11/1922 | Miller | 116/106 |
| 2,034,179 | 3/1936 | Franklin | 116/106 |
| 2,506,983 | 5/1950 | Williams | 116/106 |
| 2,777,416 | 1/1957 | Messick | 116/106 |
| 2,778,330 | 1/1957 | Jacoby | 116/106 |
| 2,936,009 | 5/1960 | Smith | 222/189 |
| 2,993,466 | 7/1961 | Sklaroff et al. | 116/103 X |
| 3,090,118 | 5/1963 | Hanzel | 428/648 X |
| 3,241,713 | 3/1966 | Clapp et al. | 222/54 X |
| 3,244,137 | 4/1966 | Garvey | 116/112 X |
| 3,259,274 | 7/1966 | Klasson et al. | 222/54 X |
| 3,269,601 | 8/1966 | Weber | 222/180 X |
| 3,530,817 | 9/1970 | Garvey | 116/112 X |
| 3,540,408 | 11/1970 | Messick | 116/106 X |
| 3,547,201 | 12/1970 | Balmes, Sr. | 169/26 |
| 3,650,328 | 3/1972 | Fujiki et al. | 222/54 X |
| 3,690,286 | 9/1972 | Gantt | 116/112 |
| 3,961,597 | 6/1976 | Lester et al. | 116/112 X |
| 4,022,148 | 5/1977 | Chapman | 116/106 |

OTHER PUBLICATIONS

Publ. "Soldering Manual," Am. Welding Society, by Edward A. Fenton, Oct. 14, 1959, pp. 15–16, 103–108.

Primary Examiner—Daniel M. Yasich
Attorney, Agent, or Firm—Davis, Hoxie, Faithfull & Hapgood

[57] ABSTRACT

A heat-sensitive assembly mountable as unit and responsive to predetermined ambient temperature conditions above normal room temperature for activating a device for protection against heat or fire, comprising thin metal plates soldered face to face with eutectic solder, with large surface area and small mass and minimum contact with the elements to which they are connected. Also an alarm assembly comprising a supporting housing, an acoustic device, a coupler assembly supported by said housing and connecting said acoustic device and said container, a thermally responsive assembly mounted on said coupler assembly. Means on said coupler assembly conducting gas from said container to said acoustic device. A valve is opened on activation of said thermally responsive assembly to cause actuation of said acoustic device. A visual signal is given by swinging down of a guard member if the container contents leak. A container can be snapped into its place in the coupler assembly. A resilient cantilever-type conduit connects the horn to the gas container and it is bent on activation of a heat-sensitive element to open a valve in the container and allow gas to pass through the conduit to the acoustic device.

11 Claims, 11 Drawing Figures

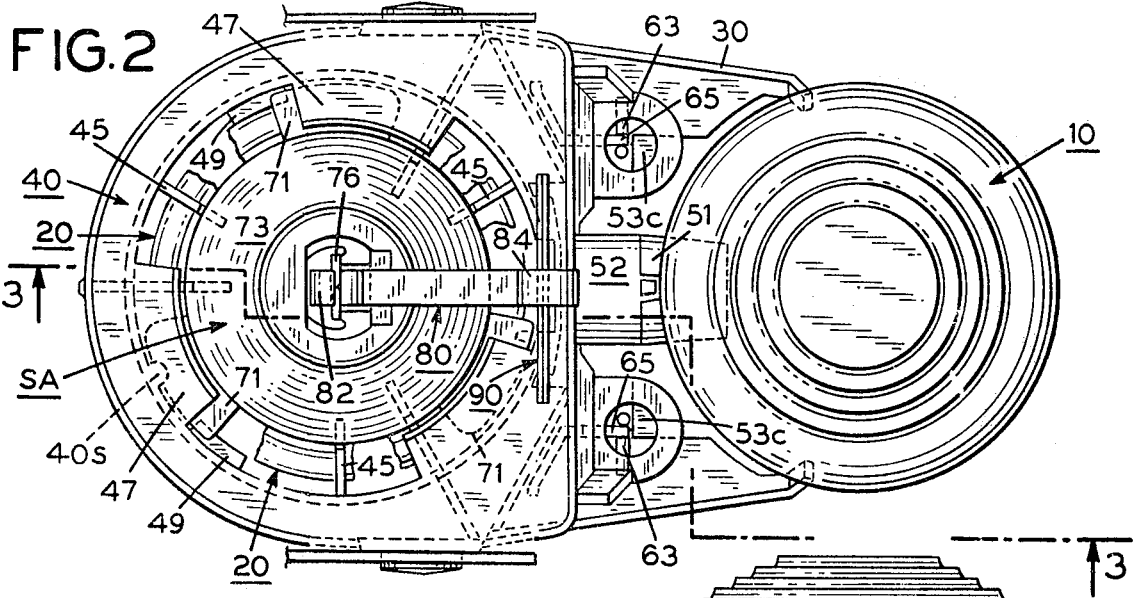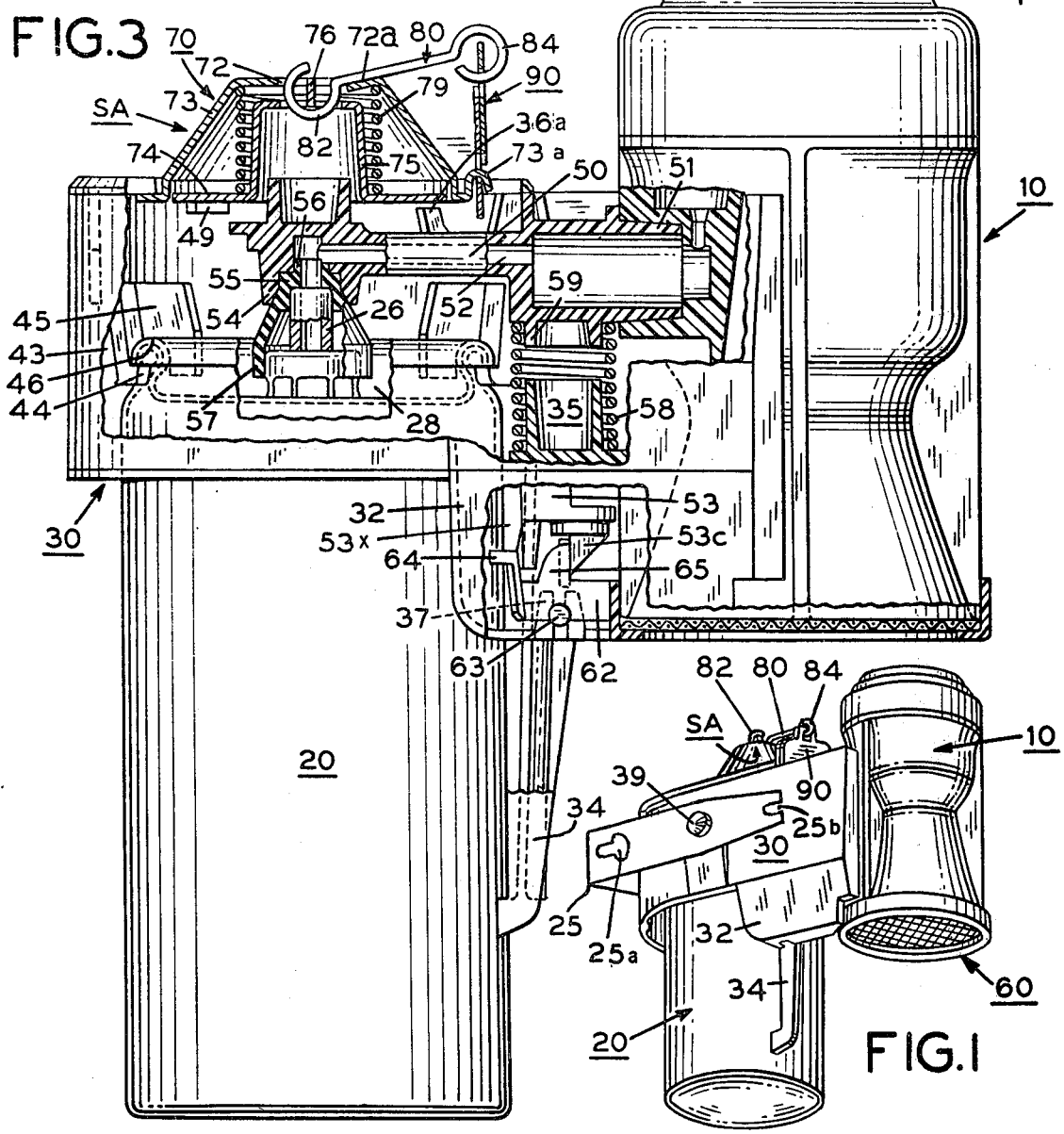

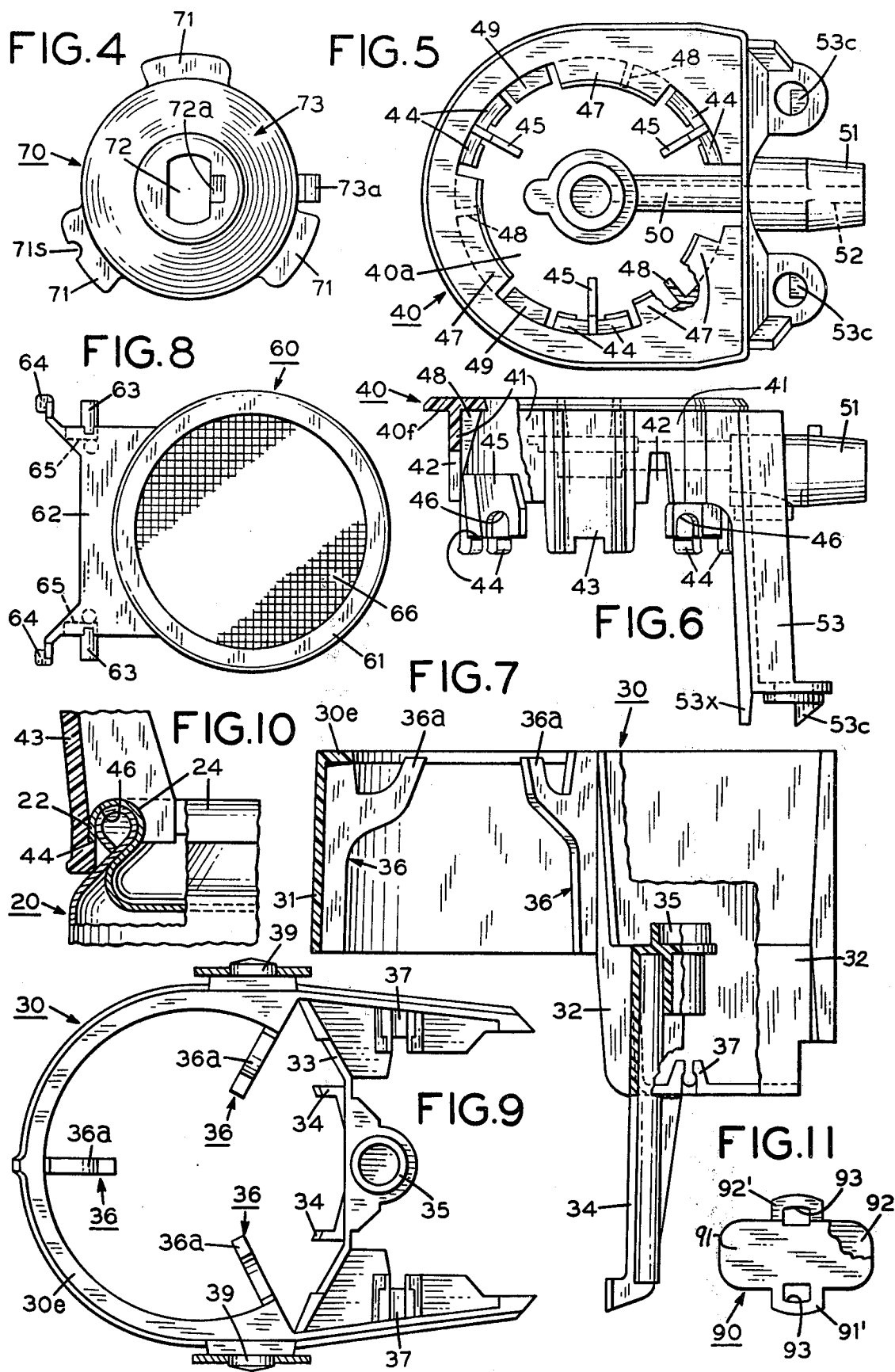

SENSOR ELEMENT AND ASSEMBLY FOR THERMALLY RESPONSIVE APPARATUS

This application is a continuation-in-part of our co-pending application Ser. No. 754,752 filed Dec. 27, 1976 now abandoned.

This invention relates particularly to fire alarm devices but in its broader aspects it relates to thermally responsive devices which are activated at a predetermined temperature to sound an alarm or to give an audible or visual signal or to stop or start apparatus or devices. More particularly the invention relates to devices in which a heat sensor assembly of the sort that utilizes eutectic metal to hold a plurality of parts or laminations in a certain position, responds at predetermined temperature above ordinary room or environmental temperature to cause activation of devices or apparatus as aforesaid.

The invention is particularly concerned with and adapted to use in connection with fire alarms of the type which give an audible sound from compressed-gas-operated horns. As will become apparent as the invention is described, features of the invention are usable with other alarms and other thermally responsive devices. Moreover, some features of the invention are of value and utility with devices other than alarms. The sensor assembly is useful in connection with other apparatus and with a variety of devices which require activation automatically at particular temperatures. Also a horn embodying the novel features of the invention is useful in alarms other than fire alarms, and in manually operated horns of general utility.

Heretofore difficulties have been encountered in the use of automatic fire alarms and fire extinguishing apparatus and systems and other equipment which relied upon a heat sensitive unit including a eutectic metal wherein adjacent parts were held together whilst under constant stress of tension, compression or shear. When the eutectic metal, usually a solder, was brought up near its critical temperature the parts held by it tended to creep or slide or separate.

Where the relationships of the apertures between the power source, typically a can of Freon (Trademark), and the horn or other acoustic device are not properly dimensioned to give optimum results or high efficiency, a larger supply of Freon in a larger can has to be used to provide long enough blowing of the horn.

If too small an aperture in the passage of gas to the horn is provided, insufficient pressure builds up and the horn will not blow or will not blow loud enough.

If the aperture is larger than necessary, the expanding gas exerts such a cooling effect that the gas flow is quickly reduced to a point where the horn stops blowing; but the gas flow becomes merely a leakage flow, or the can empties too quickly.

Moreover, in prior horns a pressure in the neighborhood of 20 psi. was required to start the horn blowing, requiring a relatively large aperture, and a large can and supply of Freon.

Prior horns made of polypropylene were unsuitable for fire alarm use because polypropylene was not sufficiently heat-resistant. It would soften or melt at too low a temperature.

Wide variations resulted in horns made with the same mold and with the same batch of plastic materials. Even if by experimentation an optimum throat height was determined for a particular horn, and a mold was made to produce it, important variations would result in the commercial products. These variations resulted in such difference in loudness and duration of sounds emanating from the same trumpet that compliance with Underwriters Laboratories' standards was impossible. A production variation that increased the throat height caused an increase in pressure of the diaphragm on the throat which in turn required greater or too great pressure build-up in the horn chamber for starting vibration of the diaphragm and blowing by the horn. On the other hand, a variation decreasing the throat height, caused reduction in pressure of the diaphragm on the throat to a point where there is insufficient sealing and thus the horn would not blow but would leak the gas wastefully, shortening the time that the Freon supply would last.

In prior fire alarms the amount of energy in the form of Freon, required to keep a horn blowing (a) for the time required, (b) at a loudness required, (c) at a specified distance to meet the Underwriters Laboratories' standards was 10–12 oz. This amount of energy required a large container. Not only was the container costly, but also the volume of Freon was costly. Also the horns were often made of expensive metals, such as zinc; and the other parts of the alarm such as the heat collector and the eutectic plug were also expensive. The result was that the alarms were unsightly and heavy, as well as expensive.

No device on the market was able to satisfy the Underwriters Laboratories' standards for gas operated horn-type fire alarms with only the energy contained in a two ounce can of Freon. The efficiency of known horns with respect to the three items a, b and c above was too low to allow use of such horns in fire alarms capable of complying with the Underwriters' standards.

Prior art devices which used whistles in lieu of gas powdered horns were of no help in connection with this invention because the problems of efficient conversion of energy into sound were entirely different or absent entirely.

One object of the invention is to provide a heat-responsive device which is accurate and quick in its response at the desired critical temperature and will give an audible alarm of fire or dangerously overheated environment.

Another object is to produce an alarm device as aforesaid having a horn as its audible element and Freon (Trademark) as its power source, wherein the ratios and relationship of the horn and power source and connections therebetween are such as to provide a long loud sound within the Underwriters Laboratories' standard while using a small size horn and a small container of Freon.

Another object is to produce a sensor element of the soldered-lamination type having less thickness and greater dependability in responding promptly at the critical temperature.

Another object is to reduce the tendency of the parts to creep when kept near the critical temperature for a long period of time. Related to this object is the aim to provide means which reduces the stress applied to the sensor unit while applying the necessary stress to the actuating portion and parts of the device. An associated object is to provide a lever connection between the sensor and the activating portion of the device.

Another object is to provide means to visually indicate by change of position of a movable element, when the amount of material in the power supply, such as pressurized gas, is reduced to a critically low amount.

Another object is to provide an element which is automatically released at a critical temperature to a position where it does not impede the sound but which in normal position will prevent access of dirt, insects and corrosive atmospheric contaminants into a horn trumpet and which functions to automatically give visual indication of inadequate supply of power fluid by dropping down when the supply becomes low.

Another object is to provide a device for attaining the aforesaid objectives which can be made principally from molded synthetic plastic materials and which can be made at a substantially lower cost than competing devices heretofore available.

Another object is to provide a device for attaining the aforesaid objectives which includes a valved container of pressurized gas having means to operate the control valve without constant application of any stress of its own on the valve.

Other objects and advantages of the invention will appear as the invention is described in connection with the accompanying drawings.

In the drawings,

FIG. 1 is a perspective view of a fire alarm device embodying the invention.

FIG. 2 is a plan view of the device with the hanger partly broken away.

FIG. 3 is an elevational section view taken along line 3—3 of FIG. 2.

FIG. 4 is a plan view of the sensor cap.

FIG. 5 is a detail top elevation view partly broken away of the alarm coupler member.

FIG. 6 is a plan view of the coupler member.

FIG. 7 is a side elevation view partly in section of the housing member.

FIG. 8 is a detail plan view, partly broken away of the insect screen.

FIG. 9 is a plan view of the housing member.

FIG. 10 is a fragmentary section view through the connection between the can and one of the securing fingers of the housing member.

FIG. 11 is a plan view partly broken away of the thermally responsive element of the sensor assembly.

THE BASIC PARTS OF THE COMBINATION

Referring to the drawings, except as hereinafter noted to be of other material, all parts shown and herein described are preferably molded from synthetic plastic material, which has characteristics to withstand temperatures under which fire alarms must function. The device comprises five basic parts or assemblies, designated generally by reference numerals as follows: horn 10, a metal can 20 containing gas under pressure, such as Freon 12 (TM), or other suitable liquefied gas under pressure, a supporting housing 30, a coupling member 40 connected to the horn 10, and a sensor assembly 70 made of metallic parts mounted upon the coupling member 40, all as hereinafter more particularly described.

THE HOUSING MEMBER AND ITS SUPPORT

The housing 30 shown assembled in FIGS. 1 and 2 and in detail in FIGS. 7 and 9, has a vertical side wall 31 curved in U-shape with skirt portions 32 depending from opposite sides at positions spaced from the curved portion. Connecting the skirt portions 32 and extending transversely of the housing is a web portion 33 (see FIG. 9) from the lower edge of which two spaced parallel guiding and positioning fingers 34 (FIGS. 3, 7 and 9) extend down in position to engage one side of the can 20 as it moves up or is pushed up into place as hereinafter described.

Also on the web 33 is formed a hollow circular spring-positioning boss 35 (FIGS. 3 and 5). This boss positions the lower end of a coiled compressed vertically positioned metal "weighing" spring 58, the upper end of which is positioned by, and seated around, a similar boss 59 on the coupling member 40 for a purpose which is hereinafter more fully explained.

Extending radially inward from the curved wall 31 of the housing are three ribs 36 with curved upwardly extending fingers 36a, whose upper extremities lie in a plane in position to be engaged by and limit the inward (downward movement of a metal actuator member, designated generally by numeral 75, after the alarm has been activated on occurrence of a fire or ambient temperature elevation above the critical temperature of the device. Normally, the actuator member does not engage the fingers 36a but is positioned to allow a small amount of movement when freed as will hereinafter be more fully described.

It is important, in order to obtain optimum sensitivity of the alarm on occurrence of a fire that the device be mounted and oriented in a position to take fullest advantage of the flow of the overheated air and gases. To that end the housing 30 is supported by a U-shaped bracket 25 preferably of stamped sheet metal and attached to the side wall of the place where located (see FIGS. 1, 2 and 3). The legs of the bracket have apertures at their lower ends to receive bosses 39 formed oppositely on the outer sides of the housing 30.

The assembled alarm is balanced about a horizontal axis passing through the bosses 39 above the center of gravity of the alarm assembly so that it hangs vertically whether the bracket 25 is attached to a ceiling or side wall.

The primary attribute of an effective heat sensor is its ability to detect a fire remote from the sensor. Fires directly under the sensor will be quickly detected even where optimum sensor orientation or position is not used or even if such position or orientation is poor. Since hot air rises, the sensor should be relatively close to the ceiling of the room it is intended to protect. Where the fire occurs in a portion of a room or corridor away from the sensor, the hot air from this fire will travel directly upward to the ceiling and will then radiate outwardly along the ceiling and down the side walls. Thus, when the sensor is mounted on a wall, the gases will flow down the wall toward the sensor. The temperature is greater at points nearest the ceiling or wall.

For these reasons it is preferable that a wall mounted device be located with the sensor element 90 as close as it can be to the wall on which the device is mounted. Preferably the bracket has keyhole shaped apertures 25a and open-ended recesses 25b for screws in each leg so that one leg or the other may be placed horizontally, flush against the side wall of the area in which the alarm is mounted.

Concurrently, since the sensor element is essentially vertical, it is also oriented substantially parallel to the direction of flow of hot gases along the wall from the ceiling. The orientation and position of the sensor causes the hot gases to flow along both sides of the sensor element so that both sides will be heated simultaneously and the sensor element temperature will reach the critical temperature quicker, resulting in quicker activation of the alarm.

Similarly, in a ceiling mounted unit, the sensor should be placed near and parallel to the ceiling. The particular embodiment described here places the element near the ceiling but (except for corridor applications, where the sensor can be appropriately positioned with its plane lengthwise of the corridor) does not always orient the sensor plates parallel to the air flow. Other embodiments are, of course, possible where the sensor element is suspended parallel to the ceiling, thus providing or guaranteeing correct orientations.

The embodiment chosen here is intended primarily for room wall and corridor ceiling mounting since these are the most widely used mounting forms.

THE COUPLER MEMBER

The coupler member 40, shown assembled in FIGS. 2 and 3 and in detail in FIGS. 5 and 6, is formed with a horizontal (FIGS. 3 and 6) flat top centrally apertured as at 40a (see FIG. 5) with a circular skirt portion 41 descending from the periphery of the aperture. The skirt is adapted to be received loosely within the supporting housing 30 by which the coupler is supported. For that purpose three slots 42, spaced equidistantly, are provided in the skirt 41 for receiving the three ribs 36 of the housing 30 (as may be observed by comparing FIGS. 6 and 7). The coupler member 40 is provided with a flat outwardly extending flange 40f which rests upon the top inwardly-extending edge 30e of the housing 30 for support.

The can 20 is a purchased part. Its cylindrical side wall curves in at its upper end and is outwardly rolled over at its periphery (see FIG. 10). A dished circular metal cover 28 has its periphery 24 curved over said rolled-over periphery of the can, providing a downwardly facing edge 22.

For supporting the can on the coupler 40 three equally spaced downward extensions 43 with bifurcated ends are formed on the skirt 41 (see FIGS. 3, 5, 6 and 1). On the inside surfaces of the bifurcations adjacent the ends thereof inwardly-directed upwardly-facing shoulders 44 are formed (see FIGS. 6 and 10). Due to the slight resilience of the extensions 43, the inwardly curved top of the can 20 (see FIGS. 3 and 10) may be pressed upwardly into the coupler between the extensions, pressing them outwardly slightly until the shoulders 44 snap under the edge 22 of the rolled-over cover 24 of the can, as best seen in FIG. 10. The can is thus held beneath the coupler 40. During this assembly of the can, the fingers 34 engage the side of the can and guide it.

In order further to ensure a secure grip on the can and to more firmly hold it, three ribs 45 are formed on the skirt 41 extending radially inward behind each of the three extensions 43. At the lower ends, i.e. the ends adjacent the can 20, an arcuate recess 46 is formed in each rib in position to embrace the inner periphery of the can cover. Thus, while the top of the can 20 is being pushed up against the resilient ends of the extensions 43, the extensions flex slightly outward until the shoulders 44 have snapped under the edge of cover and until the inner periphery of the top of the neck comes into engagement with the margins of the recesses 46 which stop the upward push.

The can 20 has a valve with a hollow stem 26 in the center of the cover 28. The valve is normally spring-pressed closed. When the stem is pressed sufficiently to overcome the spring pressure, the gas under pressure within the can, usually Freon (TM), can pass out through the stem.

For transmission of the gas to the horn 10, the coupler 40 has a connecting tube 50 extending radially with respect to the horn and can above the can. One end of the tube extends outwardly and is enlarged and externally tapered and fits into an inwardly tapered radial passage in the horn. This connection is made permanent by cement.

Horns may vary in size and design.

The key to efficient alarm design using a gas powered horn is the means for efficient conversion of the energy, stored in the form of liquefied gas, into sound energy by means of the horn. The Underwriters Laboratories requirements that the sound source must produce a minimum of 85 dBA measured at a distance of 10 feet for a minimum duration of four minutes, in effect, specify the minimum energy output and output rate. This translates to mean that the greater the horn efficiency is, the less is the energy reservoir requirement for production of the required sound output. Likewise a reduction of the input power requirement means that the alarm may be of smaller physical size and lower cost.

Small size and low cost are highly desirable attributes in an alarm. Whilst improving the functioning of the alarm system, the alarm may be made less obtrusive; and its lower cost gives greater coverage per dollar spent on a protection system.

It is desirable that the trumpet length of the alarm horns should be selected to produce a frequency to which the human ear is most sensitive (about 2,000 HZ) when powered with gas as the power source. The frequency produced depends on the horn length and the density of the gas used. The frequency selected is substantially higher than usual horn frequencies so as to make the alarm sound distinct from other sounds. A trumpet length of roughly 2 inches comes close to producing the desired frequency when used with Freon-12 gas.

Once the energy input requirement to the horn is specified, the energy from the power supply must be metered in an effective manner so as not to expend more energy than necessary.

In summary and in further explanation, to achieve our objective of producing an economical alarm which requires only a small amount of Freon and a small container, for blowing a small horn capable of producing audibility and duration of sound meeting the requirements of the Underwriters, it is necessary to provide a metering orifice in the gas passage between the can and the horn. This orifice must be compatible with the functional requirements of both the desired small can size, e.g. two ounce can, and small horn size, e.g., roughly a trumpet length of about 2 inches and slightly greater overall length. The horn per se may be of the sort that has been commercially produced under U.S. Pat. No. 3,670,689. The size of the orifice determines the rate of Freon gas delivery. The size of the orifice also determines the pressure within the can at any time interval while the can is emptying. The pressure beyond the exit side of the orifice affects the loudness and to some extent the pitch of the sound produced by a horn having given diaphragm thickness, trumpet size, chamber size and other dimensions.

Most conveniently, location of the measuring orifice is in the valve which controls emission of the gas from the can; but that location is not an essential of the invention. An orifice diameter of from about 0.010 to about 0.020 of an inch has proven satisfactory.

Bearing the foregoing factors in mind, it has been possible in accordance with the invention herein disclosed, to produce an alarm that meets Underwriters' standards, using a two ounce can of Freon and a small horn of the size above mentioned.

The gas passage or connecting tube 50 has molded integrally therewith, on the end opposite to the horn connection, a circular enlargement or fitting 54, which is coaxial with the can when assembled.

As may be seen in FIG. 3, the passage 52 of the tube 50 turns downwardly within the fitting, 54, the opening being coaxial with the stem of the valve 26 and being counter-bored.

Fitted within the counter-bore is a hollow rubber sealing element of generally truncated conical shape, its upper or inner end 55 being cylindrical and fitting snugly in the counter-bore and also around the valve stem 26. A short hollow cylindrical neck 56 extends up from said cylindrical portion 55 into the aforesaid small passage above. The lower end 57 of the sealing element fits snugly around the neck of the valve below stem 26. Thus the valve connection to the gas passage 52 is sealed effectively from contaminants of various sorts, and dirt. This is important because fire alarms often remain in place for years and must be at all times in condition to operate accurately and promptly when the occasion arises.

The sealing element also provides a gas seal from the can 20 into the passage 52 when the device operates, thus ensuring full utilization of the gas to operate the horn. There is no known gasket material which is resistant to all usual atmospheric contaminants and also resistant to Freon. Because the sealing element is outside the can, it is not in contact with the Freon except for the few minutes while the alarm is activated. Hence the material of which it is made does not have to be of a kind that is not affected by Freon. On the other hand, the sealing material used in the valve in the can 20 which is resistant to the action of Freon is kept from atmospheric contaminants because the entire gas passage from the valve 26 to the horn 10 is closed. The diaphragm of the horn in the horn chamber closes off the horn chambers at the end of the gas passage against entrance of contaminants.

As previously stated, the tubular connection 50 is resilient and can move to a limited extent when pressed. To depress the valve stem 26, the fitting 54 on the end of the tubular connection 50 must be pressed downwardly. For that purpose, the sensor assembly SA is provided (see FIGS. 2, 3 and 4).

THE SENSOR ASSEMBLY

The sensor assembly is mounted on the housing 30 and consists of a metal mounting member or cap 70, a metal coiled compression spring 79, a metal actuator member 75, a holding lever 80 and a thermally releasable link 90. These are all metal parts assembled on the cap 70 which is of frustoconical shape having a conical wall 73 and a flat top with a central aperture which has circular ends but segmental parallel straight sides as may be seen in FIG. 4.

Within the cap member is the actuator member 75 having a slightly tapered wall rising from an annular base 74 and terminating at its converging end in a flat top wall. The top wall has a semicircular aperture from which is struck up a loop 76. A coiled compression spring 79 presses at one end against the inner surface of the top all of the cap 70 and at its other end against the upper surface of the base 74 of the actuator member.

The actuator member 75 is held by the lever member 80, one end 82 of which is hooked under the actuator loop 76 while the other lever end 84 is reversely bent so that one end of a temperature responsive link sensor element 90 may be hooked onto it. The end 82 is wrapped around the loop 76 of the actuator member 75 only sufficiently to prevent disengagement as the lever is drawn into the cap 70 during activation. End 84 is open at the bottom since the link 90 will be thrown upward during activation and therefore link 90 will not be released from lever 80 on activation.

In all devices using low melting solder as the fusible element binding two parts together, there is a problem of "creep". As the ambient temperature approaches the melting point of the solder without reaching or passing it, the tension on the soldered parts causes them to creep relative to one another. Even if the critical temperature is not reached, degradation of the fusible portion of the sensor element occurs, with the result that the device no longer possesses the proper response, and premature or false responses may occur.

Moreover, it is important that the sensor element respond quickly when the ambient temperature reaches the critical point. If the ambient temperature rises quickly, massive parts of the device being at a low starting temperature may retard the response of the sensor element if they have sufficient contact to slow down the temperature rise of the sensor element to that of the adjacent parts. Thus the response of the sensor element is retarded.

According to this invention the sensor element 90 is composed of two thin flat plates 91, 92 which are soldered together with a low melting eutectic solder. Thinness of the plates is an important factor because it lowers the mass of the sensor which increases its sensitivity. The plates 91, 92 are the same in size and shape and are preferably rectangular, each having a loop 91', 92', formed along one long edge. They are soldered back-to-back with the loops 91, 92' in inverted positions. The use of thin plates in the sensor element provides a large surface area to mass ratio which avoids the need of an additional heat collecting element such as is used in prior art fire alarms in which the thermally responsive element is a fusible plug.

The surface area of fusible plugs is relatively small as compared to their mass; and they depend on heating of the adjacent parts, which is slow, to heat the plug to the eutectic temperature. Likewise, prior art fusible links or wires do not have a relatively large surface area compared to their mass due to the desire to economize on size and amount of the relatively expensive fusible material whilst providing enough of it to carry the tensile stress imposed.

It is desirable that the solder layer bonding the plates 91, 92 be extremely thin for two reasons. Firstly, the thinner the solder layer, the lower the solder mass which must be heated, and hence less heat energy is needed for melting and the faster is the response. The use of flat stock and extremely thin plates makes possible the extremely thin solder layer. The flexibility of the plates allows intimate contact over all areas thereof.

In order to achieve a thin solder layer, the solder should not alloy itself with the plates during soldering. In the alarm herein illustrated, the thickness of the solder layer preferably should be from about 0.0005 to about 0.0010 of an inch but can be as much as ten thousandths (0.010) without substantially affecting performance. However, usage of the sensor in other combinations and in other devices where a thermally responsive element is useful to activate apparatus, for example, safety or fire extinguishing apparatus or systems, may require departure from the dimensions of plate thicknesses or other dimensions or materials.

Orientation of the sensor element and the shape of its plates have an effect on its functioning. In the particular embodiment of the alarm herein disclosed the plates are generally rectangular with rounded corners, but other oblong, elliptical, circular or other shapes are within the scope of the invention. It is desirable, however, to have the width of the plates as small as possible in the direction of flow of the hot gases.

In the embodiment illustrated the tension force exerted upon the plates is perpendicular to their longitudinal axis and through the shear center of the solder bond.

If plates of the form in FIG. 11 or of other oblong shape are oriented so that the longer axis is perpendicular to the direction of flow of hot gases, the solder bond will start to melt at the leading edge of the plates and melting will progress in the direction of flow. Thus the shorter this distance is, the shorter will be the time required for the plates to separate under load. Therefore, it is desirable to have a configuration where the dimension in the direction of air flow is relatively short.

If the sensor with similar plates, used in some other combination, were oriented so that their long axis was parallel to the direction of flow of the hot gases again the melting of the solder bond would start melting at the leading edge. In this orientation the tension force would be perpendicular to the direction of flow of hot gases. As the melting progressed along the length of the plates, the shear center would move toward the trailing edge creating a scissoring effect on the solder and plates tending to break away the solder bond when the melting had progressed only part way along the length of the plates. In this orientation the scissoring effect and the break-away effect cooperate to compensate for the less advantageous orientation.

The break-away effect is present in both orientations of the sensor unit. The scissoring effect helps exploit this phenomena. However, these effects are quite small with conventional soldered materials since it was formerly thought a high strength bond was a preferred solder bond. Thus in this invention selection of unconventional materials and soldering techniques is used to exploit these effects.

The break-away effect makes design of the connections of the sensor element to the apparatus being controlled less critical. For example, if a small amount of solder remained unmelted in the area near the connecting loop 91' or 92' or both, it will break away when the bulk of the bond has melted. Thus, sensitivity will not be significantly affected by incomplete melting.

In all cases, whether the sensor element is mounted on a side wall or a ceiling, it is important that orientation of the plates should be with their plane parallel to the normal and experience-indicated direction of flow of the hot gases, in order to take full advantage of heat transfer all along the surface areas of the plates.

It is desirable that the material chosen for the plates should possess the characteristics of enough stiffness to resist buckling, and sufficient strength to resist tearing or rupture and should be resistant to corrosion by airborne gases as well as non-alloying with the solder. Stainless steel meets these criteria and is one preferred material. The use of such materials enables the plates to be very thin. The thickness of the plates in inches divided by the square root of the number of pounds of force applied to the plate may be in the neighborhood of 0.0015 to 0.006. These limits have been found workable but are not necessarily critical or limiting.

Stainless steel is a particularly desirable plate material for the following reasons. Even though the solder is selected with particular care, bearing in mind on one hand the required strength and melting temperature for a fire alarm, and on the other hand the difficulty of soldering stainless steel as compared with other metals and alloys, the bond between the solder and the stainless steel plates is not notably strong. The fact that the bond is strong enough for use in a sensor unit, as in the present invention, but is poorer than some other solder bonds, is an advantage in this invention. It helps make the sensor unit unusually sensitive and responsive to ambient temperature rise. The break-away effect is magnified by the use of stainless steel plates, thus providing a sensor unit that is unexpectedly superior to any heretofore known. Moreover, the strength of stainless steel enables very thin plates to be used while mounting of the sensor unit in tension avoids the possibility of buckling.

The size of the plates of the sensor element 90 is determined to provide a large enough area for the solder connection to avoid creep. In the present invention, this area is reduced by the use of lever 80. The lever 80 rests on the top of the cap 70 at a flattened edge portion 72a as a fulcrum (see FIGS. 4 and 3) providing a short lever arm to the loop 76 and a long lever arm to the sensor element 90. It will be noted in FIG. 3 that the distance between the connection of the loop 84 with the thermally responsive means 90 and at the point of engagement of the mid-portion of the link 80 with the edge portion 72a (the fulcrum point) is greater than the distance between said fulcrum point and the connection of the link hook 82 with the loop 76 of the actuating member 75. In the preferred arrangement illustrated the force of the activating spring 79 is reduced by a ratio of about 5:1. In order to keep to a minimum the conduction of heat from the sensor element, the contact of the plates with the parts they connect is kept very small in the following way.

The loops 91', 92' of the plates 91, 92 have curved interior edges 93 to minimize the area of contact with the parts they engage. The curved surface of one loop 92' is connected to and engages with the transversely straight interior surface of the reversely bent end 84 of the lever 80. The curved surface of the other loop 91' is connected to the transversely straight interior surface of a detent 73a which is formed by stamping into hook shape a finger that extends radially from the periphery of the cap member 70 (see FIGS. 3 and 4). Thus each curved edge of the plates 91, 92 has individual and minimum contact with the lever end 84 and detent 73a at only two sharp edges, thus inhibiting heat transfer.

The thinness of the plates of the sensor element and their relatively large surface area and the thinness of the solder layer, combined with the low force exerted on the plates and the minimum heat conductivity to the connected parts make the sensor assembly unusually sensitivity and creep-resistant. In other words, the thinness of the plates and their large surface area provided a desirable ratio or relationship which enables the sensor element to quickly adapt to the ambient temperature; and its minimum contact with the parts it connects prevents draining away of absorbed heat to the connected parts.

MOUNTING OF SENSOR ASSEMBLY

The sensor assembly SA is mounted on the coupler member 40 by a bayonet slot type of connection by providing three equidistantly spaced flat wings 71 extending from the sensor cap 70 around its periphery as may be seen in FIG. 4.

The sensor assembly may be inserted in the aperture 40a of the coupler member 40 until the wings 71 engage the flat top edges of the coupler's ribs 49 after which the sensor assembly is rotated clockwise thereby moving its wings under the radially-inwardly extending segments 47 of the coupler until one wing abuts a radially inwardly extending stop rib 48. To locate and hold the sensor assembly, a notch 71s is formed in one of the wings 71 to receive a detent formed on the coupler 40. In stopped position the bottom and top surfaces of the wings 71 are engaged and held between the ribs 49 and segments 47.

THE SCREEN

For the dual purpose of keeping insects and corrosive atmospheric contaminants out of the horn 10 and also giving a visual signal in case of leakage of the contents of the can 20, a pivoted guard member 60 is pivotally mounted within the skirt portion 32 of the housing member 30 in two aligned upwardly open bearings 37 (see FIGS. 7 and 9) formed on inward extensions at the lower edges of the skirt portions 32. Seating in these bearings are two aligned pivots 63 extending outwardly from the opposite sides of a web portion 62 of the guard member 60. The mouths of the bearing recesses are preferably slightly narrower than the pivots 63 so that the pivots may be forced into the bearing recesses, wherein they will be held pivotally on the housing 30. The guard member may either be solid or, as shown, may have a circular woven wire screen 66, which is seated in a circular rim 61 which extends laterally in approximately the same plane as the web 62. The screen supporting member 60 is dimensioned and mounted so that when in normal position, usually horizontal, it will cover the open trumpet portion of the horn 10, as shown in FIG. 3.

In order to hold the guard 60 in horn-covering position, two small feet 64 (see FIGS. 3 and 8) are formed on the member 60, one adjacent each pivot 63, extending in approximately radial directions and upward with square pads on their extremities. Pads are engaged by extensions 53x (see FIG. 6) on the coupler member 40 when the screen member is horizontal.

When the coupler member 40 has the sensor assembly secured on it and the can also is mounted on it, they, together with the horn which is cemented to it, comprise a unitary structure which weighs upon the spring 58. The Underwriters Laboratories require that a signal be given when the contents of the can have become to depleted by leakage or otherwise that insufficient Freon remains to ensure compliance with the Underwriters Laboratories' requirements with respect to loudness and duration of blowing of the horn. This invention takes advantage of the fact that if the contents of the can 20 should leak, the weight of the structure will be lessened. Depending on the strength of the weighing spring 58, a condition will arise at which the spring will have caused the unitary structure to rise slightly to disengage the extensions 53x from the feet 64.

In addition to the foregoing latching, additional latch noses 65 are formed on the web portion 62 of the screen member, one at each side edge thereof adjacent the pivots 63 but extending in planes perpendicular thereto. These latch noses engage with catches 53c formed on the ends of legs 53 extending downwardly from the coupler member 40 (see FIGS. 3, 6 and 8) into the paths of movement of the latch noses 65. This engagement will continue after the feet 64 and extensions 53x are disengaged. As the can continues to lose weight, the unitary structure will continue to rise until the noses disengage the catches 53c allowing the screen member to drop down, thus giving a visual indication that the can does not contain enough pressurized gas or liquid to blow the horn long enough to comply with Underwriters' standards. During the rise, the container 20 will be guided by the guide fingers 34 on the housing 30.

If the screen member is disengaged, it will usually be hanging down vertically. When it is pivoted into the horn covering position as shown in FIG. 2, the nose 65 engages the slanted edge of the catch and pushes it until the nose snaps behind the catch. This will occur when the screen member reaches a position between horizontal and about 15° less than horizontal.

Assuming that the can is full and all parts are assembled and in place as above described, the operation of the alarm is as follows.

When the ambient temperature reaches approximately 136° F. (or a higher critical temperature for which the device may have been designed), the sensor assembly will be activated by melting of the solder connection between plates 91, 92 releasing them. Thereupon the force of activating spring 79 will move the actuating member 75 down into engagement with the enlargement or fitting portion 54 of the flexible tube 50 depressing the fitting which in turn will depress the valve stem 26 releasing gas from the can 20. The gas under pressure will pass through the valve stem 26 and tube passage 52 into the horn 10 causing the horn to blow.

Upon activation of the alarm, the member 75 not only activates the horn, but it also engages the tops of the fingers 36a, lifting the unitary structure or subassembly, including coupler member 40 and its catch 53c releasing the screen member from its position in FIG. 1. This clears the obstruction of the horn mouth that would otherwise impede and reduce the sound.

The underside of the supporting fingers 36a limit the motion of the sub-assembly relative to the housing so that they will not become disengaged.

Herein whenever Freon is mentioned, Freon 12 (dichlorofluoromethane) is preferred, but the invention is not limited thereto, since the invention can be used with other high density fluids which vaporized at atmospheric normal temperatures and pressures.

From the foregoing, it will be apparent that the invention provides a much smaller alarm than has heretofore been possible, which is adapted to respond more quickly than heretofore to ambient temperature rise to the critical temperature and which can be made of inexpensive materials. Also, the parts can be easily assembled mostly by snapping or by a slight rotary motion. Additionally a smaller power supply container can be used to sound the alarm for the required length of time.

In some buildings for example, in hospitals, nursing homes, and other places where somewhat similar situations exist, it is undesirable to use an acoustic device. In such instances it is possible to use the invention without an acoustic device and instead to substitute a pressure responsive electric switch or other pressure responsive device connected to the outlet of the tube 52 which will activate signalling means or other apparatus to alert personnel of the overheated condition where the device is loated.

Many other modifications and uses of the invention in whole or in part will appear to those skilled in the art. Therefore the invention is not limited to the specific form of the embodiment as illustrated and described.

We claim:

1. A heat sensitive unit responsive to predetermined ambient temperature conditions requisite for activating fire alarm and extinguishing and heat-sensitive protective apparatus, comprising an assembly of two metal members having surfaces which overlap throughout an area, a thin layer of low melting point solder responsive to said conditions between said members within said area forming a joint between said members, at least one of said members being made of a metal which does not alloy significantly with said solder at conventional soldering temperatures while the solder is molten during the joining of said members, the bond which is created between said member and said solder at said temperatures being weaker than the solder strength in shear and tension, and means formed on each of said members for connecting them to a force less than the strength of said bond tending to pull them apart to activate the apparatus, the weakness of said bond in cooperation with heating of said solder as it reaches its melting point at said predetermined ambient temperature causing the pulling apart of said plates to occur by breaking away of said bond at the interface of said solder layer with at least one of said members after partial melting of the solder rather than by breaking away after substantially complete melting of the solder, thereby hastening the pulling apart of said members.

2. A heat sensitive unit as claimed in claim 1 wherein said members are plates and the connecting means on one plate is located on the opposite side of the unit from the other whereby, when the flow of hot gases is crosswise of the direction of force, a scissoring effect is created as the solder melting proceeds from the leading edge of the plates inwardly, said scissoring effect in cooperation with said weaker bond causing break-away of the solder bond when the solder is not completely melted and hastening the pulling apart of said plate members to activate the apparatus.

3. A heat sensitive unit as claimed in claim 2 wherein the solder layer thickness is between approximately 0.010 and 0.0005 of an inch.

4. A heat sensitive element as claimed in claim 2 and means to mount said element with its plane in the expected directions of flow of hot gases.

5. A heat sensitive unit as claimed in claim 1 wherein said members are plates of stainless steel, the thickness of the solder layer being between approximately 0.010 and 0.005 of an inch.

6. A heat sensitive element as claimed in claim 1 wherein said members are plates made of stainless steel and wherein, when the flow of hot gases is crosswise of the direction of force, a scissoring effect is created as the solder melting proceeds from the leading edge of the plates inwardly, said scissoring effect in cooperation with said weaker bond causing breakaway of the solder bond when the solder is not completely melted and hastening the pulling apart of said plate members.

7. A heat sensitive unit responsive to predetermined ambient temperature conditions requisite for activating fire alarm and extinguishing and heat-sensitive protective apparatus, comprising two members having surfaces which overlap throughout an area, a thin layer of low melting point solder responsive to said conditions between said members within said area securing said members together, at least one of said members being made of a material which does not alloy significantly with said solder while the solder is molten during assembly and creates a bond which is weaker than the solder strength in shear and tension, the thickness in inches of said one of said members divided by the square root of the number of pounds of force applied to said member being between approximately 0.0015 and 0.006, and means formed on each of said members for connecting them to force less than the strength of said bond tending to pull them apart to activate the apparatus, the weakness of said bond in cooperation with heating of said solder as it reaches its melting point at said predetermined ambient temperature causing the pulling apart of said plates to occur by breaking away of said bond at the interface of said solder layer with at least one of said members after partial melting of the solder rather than by breaking away after substantially complete melting of the solder thereby hastening the pulling apart of said members.

8. A heat sensitive unit as claimed in claim 7, wherein the solder layer thickness is between approximately 0.010 and 0.0005 of an inch.

9. A heat sensitive unit responsive to predetermined ambient temperature conditions requisite for activating fire alarm and extinguishing and heat-sensitive protective apparatus, comprising two plate members having surfaces which overlap throughout an area, a thin layer of low melting point solder responsive to said conditions between said members within said area securing said members together, at least one of said members being made of material which does not alloy significantly with said solder while molten during assembly and creates a bond which is weaker than the solder strength in shear and tension, the thickness in inches of said one of said members divided by the square root of the number of pounds of force applied to said members being between approximately 0.0015 and 0.006, and means formed on each of said members for connecting them to a force tending to pull them apart to activate the apparatus, the weakness of said bond in cooperation with heating of said solder as it reaches its melting point at said predetermined ambient temperature conditions causing the pulling apart of said plates to occur by breaking away of said bond at the interface of said solder layer with at least one of said members after partial melting of the solder rather than by breaking-away after substantially complete melting of the solder thereby hastening the pulling apart of said members.

10. A heat sensitive unit as claimed in claim 9 wherein the solder layer thickness is between approximately 0.010 and 0.0005 of an inch.

11. A heat sensitive unit responsive to a flow of heated gases at predetermined ambient temperature conditions for activating apparatus, comprising two oblong plate members having surfaces which overlap throughout an area, a thin layer of solder between said members within said area securing said members together, at least one of said members being made of stainless steel which does not alloy significantly with said solder while the solder is molten during assembly and creates a bond which is weaker than the solder strength in shear and tension, the thickness in inches of said one of said members divided by the square root of the number of pounds of force applied to said members being between approximately 0.0015 and 0.006, and means formed on the opposite sides of the longer dimension of each of said members for connecting them to a force tending to pull them apart, whereby when the flow of gases is crosswise of the direction of force acting to melt said solder, a scissoring effect is created as the solder melting proceeds from the leading edge of the plates inwardly, said scissoring effect in cooperation with said weaker bond causing break-away of the solder bond when the solder is not completely melted and hastening the pulling apart of said plate members to activate the apparatus.

* * * * *

UNITED STATES PATENT AND TRADEMARK OFFICE
CERTIFICATE OF CORRECTION

PATENT NO. : 4,170,189
DATED : October 9, 1979
INVENTOR(S) : Michael Pappas et al.

Page 1 of 2

It is certified that error appears in the above-identified patent and that said Letters Patent are hereby corrected as shown below:

Column 2, line 36: "powdered" should be --powered--.

Column 4, line 15: after "(downward" insert parenthesis--)--.

Column 8, line 2: "all" should be --wall--.

Column 10, line 36: Delete "at" after "and".

Column 10, line 65: "sensitivity" should be --sensitive--.

Column 12, line 56: "vaporized" should be --vaporize--.

Column 13, line 8: "loated" should be --located--.

Column 13, line 14: "to predetermined" should be --within a predetermined range of--.

Column 13, line 34: --conditions-- should be inserted after "ture".

UNITED STATES PATENT AND TRADEMARK OFFICE
CERTIFICATE OF CORRECTION

PATENT NO. : 4,170,189

DATED : October 9, 1979

INVENTOR(S) : Michael Pappas et al.

It is certified that error appears in the above–identified patent and that said Letters Patent are hereby corrected as shown below:

<u>Column 14, line 3</u>: "to predetermined" should be --within a predetermined range of--.

<u>Column 14 line 30</u>: Numeral "7" should be --1--.

<u>Column 14, line 33</u>: "to predetermined" should be --within a predetermined range of--.

<u>Column 14 line 59</u>: Numeral "4" should be --1--.

Signed and Sealed this

Twenty-sixth Day of February 1980

[SEAL]

Attest:

Attesting Officer

SIDNEY A. DIAMOND

Commissioner of Patents and Trademarks